Nov. 29, 1955  R. W. HUDON  2,724,921
PORTABLE INSECT REPELLING DEVICE
Filed Oct. 12, 1953

Raymond W. Hudon
INVENTOR.

United States Patent Office 2,724,921
Patented Nov. 29, 1955

2,724,921

PORTABLE INSECT REPELLING DEVICE

Raymond W. Hudon, Dover, N. H.

Application October 12, 1953, Serial No. 385,445

3 Claims. (Cl. 43—127)

This invention relates to a portable insect repelling device, and more particularly to a device for producing a quantity of smoke for repelling insects.

An object of this invention is to provide a portable device for generating smoke for repelling insects.

Another object of this invention is to provide a smoke producing device for repelling insects and having means secured thereto for increasing the quantity of smoke produced.

A further object of this invention is to provide a smoke producing device which is insulated to prevent the user thereof from suffering burns due to contact with the device.

A still further object of this invention is to provide a smoke producing device which is portable and has means thereon for securing the device to the belt of a user.

A yet further object of this invention is to provide a smoke producing device which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
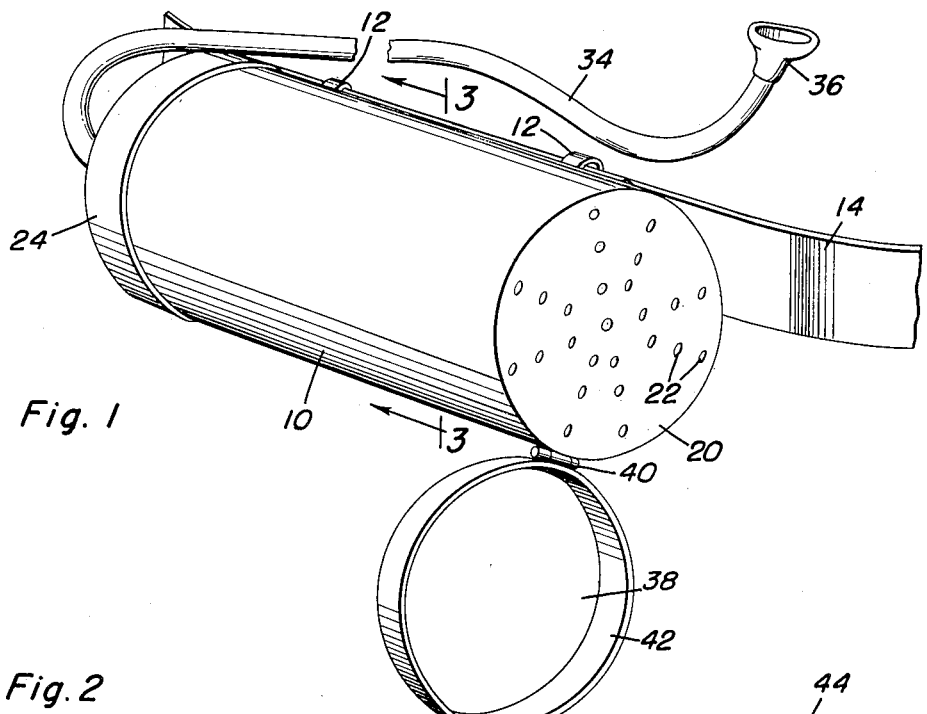
Figure 1 is a perspective view of the portable insect repeller forming the subject of this invention.
Figure 2:
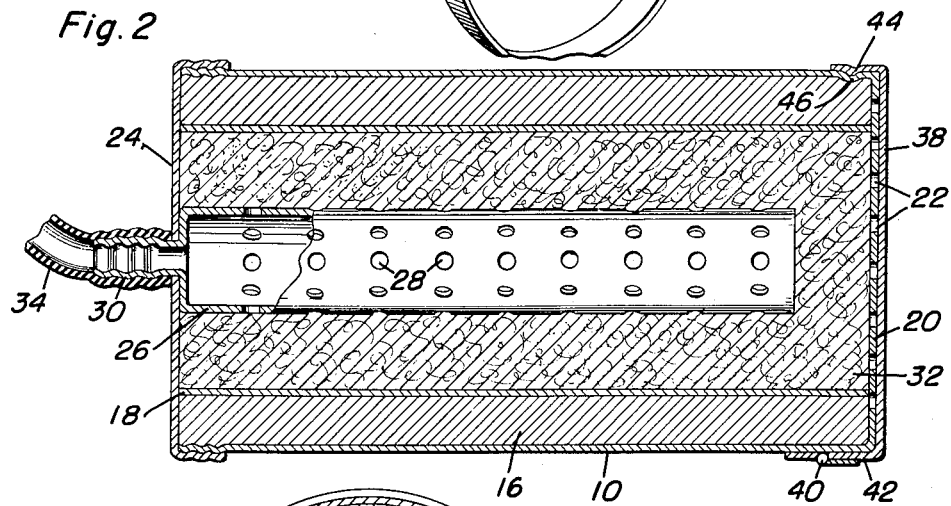
Figure 2 is a vertical sectional view of the insect repelling device, forming the subject of this invention.
Figure 3:
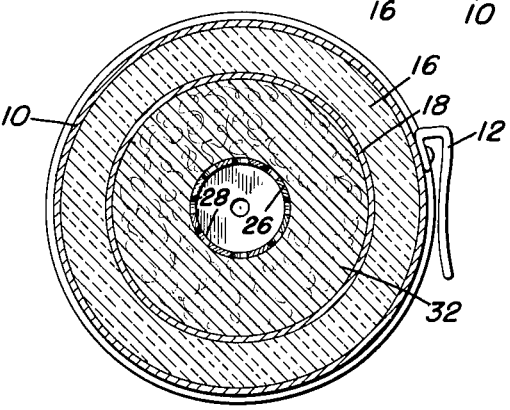
Figure 3 is a sectional view, taken substantially along the section line 3—3 of Figure 1.

Referring now more specifically to the accompanying drawings, it will be seen that the improved portable insect repelling device forming the subject of this invention includes, as shown in Figure 1, a casing 10 having a pair of spaced brackets 12 secured to one side thereof, which brackets are adapted to engage the belt 14 of a wearer to support the casing 10 thereon. The casing 10 is preferably tubular in shape and the brackets 12 are formed of spring clips secured at one end to the casing 10 and extending closely adjacent the wall of the casing 10.

The casing 10 has a layer of insulating material 16 disposed therein and extending along the sides thereof. The insulating material 16 extends the length of the casing 10. An inner housing 18 is disposed within the casing 10 inwardly of the insulating material 16. The inner housing 18 also extends the full length of the casing 10.

One end of the casing 10 is provided with a closure member 20 for closing the end of the casing 10. The closure member 20 is provided with a plurality of apertures 22, the purpose of which will be later described. The closure member 20 may be made integral with the casing 10 or may be fixedly secured thereto in any suitable manner.

The other end of the casing 10 is closed by a closure member 24. The closure member 24 is removably secured to the casing so as to permit access to the interior of the casing. This can be accomplished in any suitable manner with a screw-type connection being shown. The closure member 24 is provided with a central aperture, the purposes of which will be later described.

A longitudinal pipe 26, having a closed end, is longitudinally disposed within the casing 10 and inwardly of the inner housing 18. The pipe 26 is provided with a plurality of apertures 28 and an extension 30 on the end opposite the closed end thereof. The extension 30 extends through the opening in the closure member 24 so as to be positioned outside of the casing 10.

The inner housing 18 is filled with a mass of slow burning material. This material may be formed of rags or other textiles as well as sawdust or wood chips tightly packed. The mass of slow burning material 32 completely surrounds the pipe 26.

A tube 34 is connected at one end to the extension 30. The other end of the tube 34 is provided with a mouthpiece 36 fixedly secured thereto. Thus, air passing through the tube 34 will pass through the apertures 28 in the pipe 26 and through the mass of slow burning material 32. When the mass of slow burning material 32 is ignited, the air passing therethrough will aid in the combustion thereof. The smoke generated by the burning material 32 will pass through the apertures 22 to the outside of the casing 10.

Means are provided for sealing the apertures 22 when the device is not being used. This means comprises a cover 38 pivotally secured as at 40 to one side of the casing 10 adjacent the end thereof which is closed by the closure member 20. The cover 38 is provided with a flange 42 to which the pivotal connection is made. The flange 42 is provided with an inwardly extending projection 44 at a point diametrically opposite the pivotal connection 40. The casing 10 is provided with a recess 46 at the diametrically opposite point from the pivotal connection 40. When the cover is in position overlying the closure member 20 and apertures 22, the projection 44 will engage the recess 46 for retaining the cover 38 in closed position.

In practical use, when it is desired to use the device, the clips 12 are engaged on the belt 14 of the user. The cover 38 is moved to an open position. Then the slow burning material 32 is ignited and the user of the device blows into the mouthpiece 36 to force air through the slow burning material 32 and cause a more rapid combustion thereof. The smoke from the combustion of the material will pass through the apertures 22 to repel insects. When it is desired to stop the device, the cover 38 is moved to closed position.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A portable insect repelling device comprising a tubular casing, a layer of insulating material disposed in said casing and extending completely around the periphery and throughout the length thereof, an inner housing mounted in said casing inwardly of said insulating material, a first closure having a central opening therein closing one end of said casing, a perforated pipe extending longitudinally within said inner housing and having a portion thereof extending through said opening outwardly of the casing, and a second closure having a plurality of openings therein closing the other end of said casing, said inner housing being completely filled with a mass of slow burning material, said material completely surrounding said perforated pipe, a tube connected at one end to the outer end of said perforated pipe, and a mouthpiece secured to the other end of said tube whereby a person can blow into said tube causing air to pass from said perforated pipe through said slow burning material.

2. An insect repelling device comprising a container having side walls, a closed end and an open end, a layer of insulating material disposed in said container along the side walls thereof, an inner housing open at both ends disposed in said container inwardly of said insulating material, a closure member for the open end of said container having a central single aperture therein, a perforated pipe secured to said closure extending longitudinally within said housing, said pipe having an extension extending through said aperture, said closed end having a plurality of apertures therein, and a mass of slow burning material completely filling said inner housing and surrounding said pipe.

3. An insect repelling device comprising a container having side walls, a closed end and an open end, a layer of insulating material disposed in said container along the side walls thereof, an inner housing open at both ends disposed in said container inwardly of said insulating material, a closure member for the open end of said container having a central aperture therein, a perforated pipe secured to said closure extending longitudinally within said housing, said pipe having an extension extending through said aperture, said closed end having a plurality of apertures therein, and a mass of slow burning material completely filling said inner housing and surrounding said pipe, a tube connected at one end to the extension on said pipe and a mouthpiece secured to the other end of said tube whereby a person can blow into said tube causing air to pass from said perforated pipe through said slow burning material and then outwardly through said plurality of apertures.

References Cited in the file of this patent

UNITED STATES PATENTS

| | | |
|---|---|---|
| 42,380 | Kidder | Apr. 19, 1865 |
| 248,306 | Gooday et al. | Oct. 18, 1881 |
| 886,337 | Balken | May 5, 1908 |
| 1,039,862 | Welton | Oct. 1, 1912 |
| 1,430,772 | Van Meter | Oct. 3, 1922 |

FOREIGN PATENTS

| | | |
|---|---|---|
| 50,120 | Germany | Dec. 24, 1889 |